(12) United States Patent
Wiesemann et al.

(10) Patent No.: US 12,459,219 B2
(45) Date of Patent: Nov. 4, 2025

(54) GROOVE GEOMETRY FOR INJECTION MOLDED POLYPROPYLENE COATED FIELD JOINTS

(71) Applicant: SHAWCOR LTD., Toronto (CA)

(72) Inventors: Pablo Wiesemann, Spring, TX (US); Roberto Del Callejo Vargas, Katy, TX (US); Corentin Lazarus, Houston, TX (US); Magne Skinstad, Fannrem (NO); Craig Sloan, Houston, TX (US); Alexandra Sperber, Houston, TX (US); Marcos Mockel, Magnolia, TX (US)

(73) Assignee: 2543500 ALBERTA LTD., Calgary (CA)

( * ) Notice: Subject to any disclaimer, the term of this patent is extended or adjusted under 35 U.S.C. 154(b) by 931 days.

(21) Appl. No.: 16/753,834

(22) PCT Filed: Oct. 5, 2017

(86) PCT No.: PCT/CA2017/051190
§ 371 (c)(1),
(2) Date: Apr. 6, 2020

(87) PCT Pub. No.: WO2019/068163
PCT Pub. Date: Apr. 11, 2019

(65) Prior Publication Data
US 2020/0282677 A1    Sep. 10, 2020

(51) Int. Cl.
*B29C 70/84*    (2006.01)
*B29C 45/14*    (2006.01)
(Continued)

(52) U.S. Cl.
CPC ........ *B29C 70/84* (2013.01); *B29C 45/14311* (2013.01); *B29C 45/14622* (2013.01);
(Continued)

(58) Field of Classification Search
CPC .......................... F16L 58/1054; F17D 5/005
(Continued)

(56) References Cited

U.S. PATENT DOCUMENTS 3,610,291 A * 10/1971 Heslop .................. F16L 58/181
138/146
4,146,060 A *  3/1979 Garrett .................... B23P 11/00
138/146
(Continued)

FOREIGN PATENT DOCUMENTS

CA    2853752         5/2013
GB    2519816 A       5/2015

*Primary Examiner* — David R Deal
(74) *Attorney, Agent, or Firm* — HUNTON ANDREWS KURTH LLP (57) ABSTRACT

In an injection molded polypropylene field joint of an oil or gas pipeline, the three-dimensional geometry of the injection molded/cast coating can have an influence on the stress placed on the line coating during cooling. Specifically, it has been found that molding or casting a coating having circumferential grooves, or other groove geometry, proximal to the interface with the line coating, will reduce line coating failure proximal to the field joint, in particular line coating failure related to the initial spooling/reeling of the pipe.

10 Claims, 13 Drawing Sheets

(51) Int. Cl.
*F16L 58/10* (2006.01)
*F17D 5/00* (2006.01)

(52) U.S. Cl.
CPC .......... *F16L 58/1054* (2013.01); *F17D 5/005* (2013.01); *B29C 2045/14319* (2013.01)

(58) Field of Classification Search
USPC .......................................... 138/99, 145, 146
See application file for complete search history.

(56) References Cited

U.S. PATENT DOCUMENTS

| | | | |
|---|---|---|---|
| 2011/0174412 A1* | 7/2011 | Jebasinski | F28F 13/18 138/145 |
| 2015/0007999 A1* | 1/2015 | Viellard | E21B 17/012 166/345 |
| 2016/0003406 A1* | 1/2016 | Hoffmann | E21B 36/003 285/47 |
| 2016/0279847 A1* | 9/2016 | Hoffmann | F16L 59/20 |
| 2017/0144343 A1* | 5/2017 | Recher | F16L 58/181 |

* cited by examiner

GROOVE GEOMETRY FOR INJECTION MOLDED POLYPROPYLENE COATED FIELD JOINTS

FIELD OF THE INVENTION

The invention relates to injection molded polypropylene field joints for oil and gas pipeline.

BACKGROUND OF THE INVENTION

Steel pipe or conduit used in oil and gas transportation applications (oil and gas pipeline) is typically coated for corrosion resistance, impact resistance, and often thermal insulation. Discrete pipe lengths, for example 12 metre pipe lengths, are coated in a factory, with what is called a "line coating", which is typically a powder coating, an extrusion coating, or a multi-layer coating comprising both powder and extrusion coats. In many cases, the line coating comprises a thin fusion bonded epoxy (FBE) layer directly on the pipe, for corrosion resistance, followed by a thicker primarily polyolefin-based extrusion applied coating for impact resistance, thermal insulation, and other desirable properties. In some cases, a line coating may comprise a foam or syntactic insulation layer, which is, in turn, coated with a polyolefin-based rigid topcoat.

Line coatings cover most of the pipe surface, providing the desirable corrosion and impact resistance, but typically, a small area at each end of the discrete pipe length (for example, 200 mm) is left bare of coating, so that the pipe lengths can be welded together to form much longer pipe lengths, in the field or at a location closer to the installation point. Often, line coatings also comprise a chamfer area, where the coating is chamfered from its full thickness to zero thickness at the bare steel pipe. The bare steel and chamfered coating sections of pipe are generally referred to as the "cutback region".

Line coatings provide excellent uniformity of coating, since they are applied in a factory setting, where coating variables, such as temperature, dust control, extrusion mix and speed, etc., can be tightly controlled to desired parameters.

The pipe lengths are joined in the field, or, for example, in a portable factory closer to the pipe installation location, into much longer pipe lengths, by welding the steel ends of two pipes together in a "girth weld", then adding a coating around the cutback region of both pipes (a "field joint"). Field joint coatings may be added by many different means, including shrink-applied casings, or cast or injection molded polyolefins. The much longer pipe lengths, each comprising several discrete pipe lengths and several field joints, may be reeled for storage or for ease of application; these reeled pipe lengths may be placed on a ship, for example, for use in laying pipeline across an ocean.

In many instances, field joints are applied by injection molding or casting. For this type of field joint, generally, the steel pipe lengths are welded together, cleaned, optionally an FBE coating is applied and/or an adhesive, then a cast or mold is placed and/or fastened or clamped overtop of the entirety of the field joint area, connecting the line coatings of the two discrete pipe lengths being joined. The cast or mold is filled or injected with a desired coating compound, in melted form, such as polypropylene. The coating compound is then allowed to cool and (typically) the cast or mold is then removed. The coating thus coats the entirety of the field joint area, overlapping both line coatings in an overlap region, and provides a continuous corrosion/impact protection and insulation to the pipeline.

Injection Molded Polypropylene—based field joint coatings are known, and certain improvements in this technology can be found in PCT applications PCT/CA2016/050049 and PCT/CA2015/051031, incorporated herein by reference.

One of the challenges with injection molded or cast coatings is that, as they cool, they shrink slightly, placing stress on the line coating proximal to the field joint. This stress is aggravated when the pipe is reeled, which can cause cracking or other undesirable imperfections and/or failures in the line coating proximal to the field joint, or in the field joint coating itself.

SUMMARY OF THE INVENTION

According to one aspect of the present invention is provided an injection molded polypropylene (IMPP) coating for a field joint of an oil or gas pipeline, said IMPP coating having at least one circumferential groove.

In certain embodiments, the at least one circumferential groove is within the chamfer region of the pipe joint.

In certain embodiments, the at least one circumferential groove runs along the entire circumference of the IMPP coating.

In certain embodiments, the at least one circumferential groove runs along at least half the circumference of the IMPP coating.

In certain embodiments, the at least one circumferential groove has a hemispherical profile.

In certain embodiments, the at least one circumferential groove has an elliptical profile.

In certain embodiments, the at least one circumferential groove has a radius of less than 50% of field joint thickness.

In certain embodiments, the at least one circumferential groove has a radius that is smaller than a vertical distance from a centroid to an intersection point of a linepipe coating on said pipeline.

In certain embodiments, the at least one circumferential groove has a depth of greater than 10 mm.

In certain embodiments, the coating has at least two circumferential grooves.

In certain embodiments, the coating has at least four circumferential grooves.

According to a further aspect of the present invention is provided a mold for an injection molded polypropylene coating, having an interior surface, comprising at least one radial projection with a convex cylindrical profile within its interior surface, which provides at least one circumferential groove in the injection molded polypropylene coating.

In certain embodiments, the convex cylindrical profile provides the circumferential groove with a hemispherical shape.

In certain embodiments, the convex cylindrical profile provides the circumferential groove with an ellipsoid shape.

In certain embodiments, the radial projections run along the entire circumference of the interior surface.

In certain embodiments, the radial projections run along at least half of the circumference of the interior surface.

In certain embodiments, the radial projections have a radius of greater than 10 mm.

In certain embodiments, the mold has at least two radial projections providing at least two circumferential grooves in the injection molded polypropylene coating.

In certain embodiments, the mold has at least four radial projections providing at least four circumferential grooves in the injection molded polypropylene coating.

According to a further aspect of the present invention is provided a method of coating a cutback region of a pipe, comprising: placing a mold of any one of original claims 12 to 19 of the priority publication WO2019/068163 around said pipe, and injection molding a liquid polypropylene around said pipe and within said mold.

DESCRIPTION OF EXAMPLE EMBODIMENTS

It has been found that the three-dimensional geometry of the injection molded/cast coating can have an influence on the stress placed on the line coating during cooling. Specifically, it has been found that molding or casting a coating having circumferential grooves, or other groove geometry, proximal to the interface with the line coating, will reduce line coating failure proximal to the field joint, in particular line coating failure related to the initial spooling/reeling of the pipe.

Figure 1:
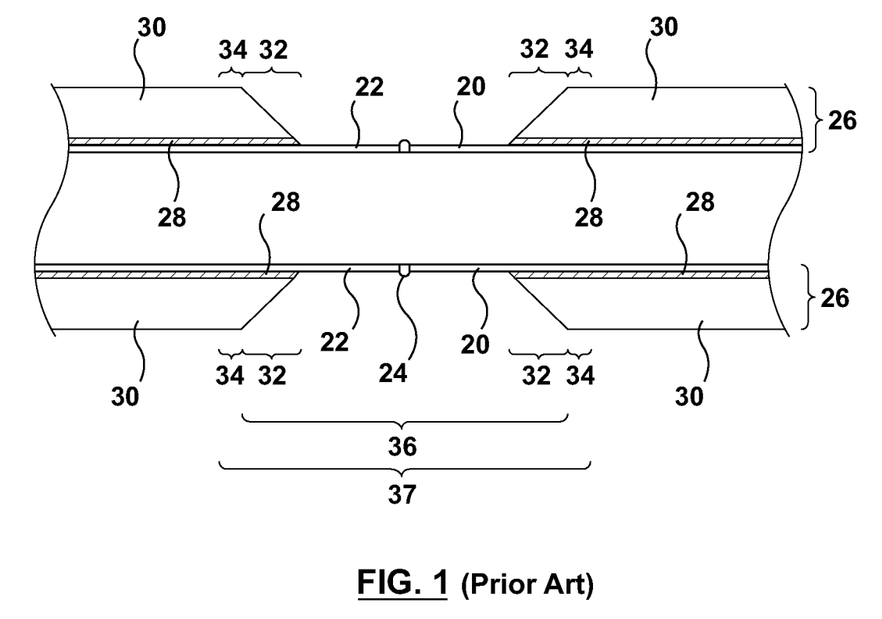
FIG. 1 is a cross-sectional, generally schematic view of a typical cutback region of an oil or gas pipe.

A typical cutback region 36 of a pipe can be shown, as a generally cross-sectional, generally schematic view, in FIG. 1. Two sections of steel pipe 20, 22 are welded together at girth weld 24. The steel pipe 20, 22 is coated in a line coating 26 which comprises a thin FBE layer 28 and a thicker polyolefin layer 30, typically polypropylene. The line coating 26 is chamfered in chamfer region 32, which is the portion of the cutback region 36 having a conical surface of line coating, between the full thickness overlap region 34 and the bare pipe region 20, 22. Also shown is overlap region 34. The entire cutback region 36 is also shown, as sit the field joint region 37 which also contains overlap region 34, which is the section of full thickness line coating which overlaps with the IMPP coating when the IMPP coating is applied.

Example 1: IMPP Coating of Field Joint (Prior Art)

A field joint was coated using a generally known IMPP process, as follows.

Surface Preparation

The steel surface of the cutback region, comprising exposed ends of steel pipe 20, 22 and girth weld 24, was visually inspected to determine that dents, laps, damaged bevels, or other obvious defects were within required allowances. The surface was also inspected for grease, oil, or other contamination, and relative humidity was measured. The steel surface was heated to at least 5° C. above dew point with an induction coil.

The exposed steel surface areas of the cutback region 36 were then abrasive blasted to achieve desired surface profile and steel cleanliness. Chamfer 32 and overlap regions 34 were masked during the blasting to minimize damage. The exposed steel surface areas of the cutback region 36 were then blown clean with dry compressed air and vacuumed to remove residual abrasive and dust. The cutback region 36 was then inspected for cleanliness, inclusions or other surface defects, and acceptable surface profile and residual dust.

Figure 2:
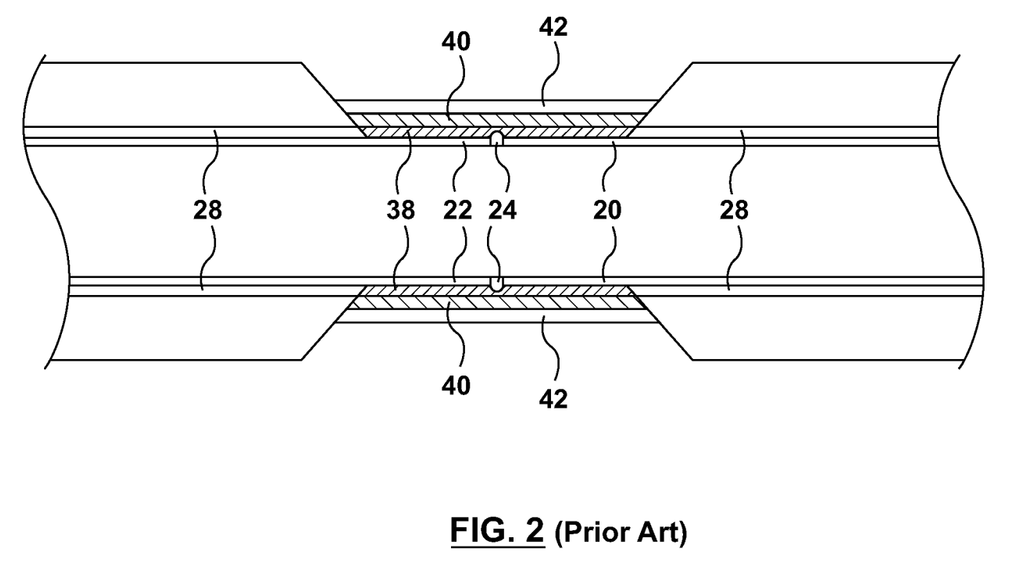
FIG. 2 is a cross-sectional, generally schematic view of a typical cutback region of an oil or gas pipe, where a three layer FBE/tie/Adhesive coating have been added.

The overlap 34 and chamfer 32 regions of were then prepared by exposing fresh parent coating, by scraping, planning, or machining the coating, with residual material removed using compressed air (See FIG. 2).

An induction coil was placed around the cutback region 36 and used to heat up the steel, as per standard protocol. Hand held contact thermometers were used to verify temperature.

A fusion bonded epoxy (FBE) powder was applied to the exposed steel surface areas of the cutback region 36, by electrostatic hand flocking with spray guns, to obtain a generally even film of FBE (FBE layer 38). An intermediate adhesive mix coat, or tie layer 40, containing adhesive and FBE, was then applied overtop of the FBE layer 38 within the gel time of the underlying FBE layer 38. An adhesive top coat 42 was then applied overtop of the tie layer 40, to provide an even film until the desired FBE+adhesive thickness (i.e. the sum thickness of FBE layer 38, tie layer 40, and adhesive top coat 42) was reached. Because the tie layer 40 coat and the adhesive top coat 42 were added before the FBE coat fully gelled, the three layers essentially formed a single continuous gradient layer, but are shown in FIG. 2 as three layers—FBE coating 38, tie coating 40 and adhesive coating 42. As can be appreciated, FIG. 2 is in generally schematic form, and the total thickness of the three coatings 38, 40 and 42 is quite think relative to the line coating 26. As can also be appreciated, although this preferable, three coating layer is described, in some examples and some applications, a simple FBE layer may be sufficient, rather than the single continuous gradient layer as hereinbefore described.

The entire cutback region 36, including the chamfer 32 and overlap 34 regions, were heated using a near IR heater, as per standard protocol.

Figure 3:
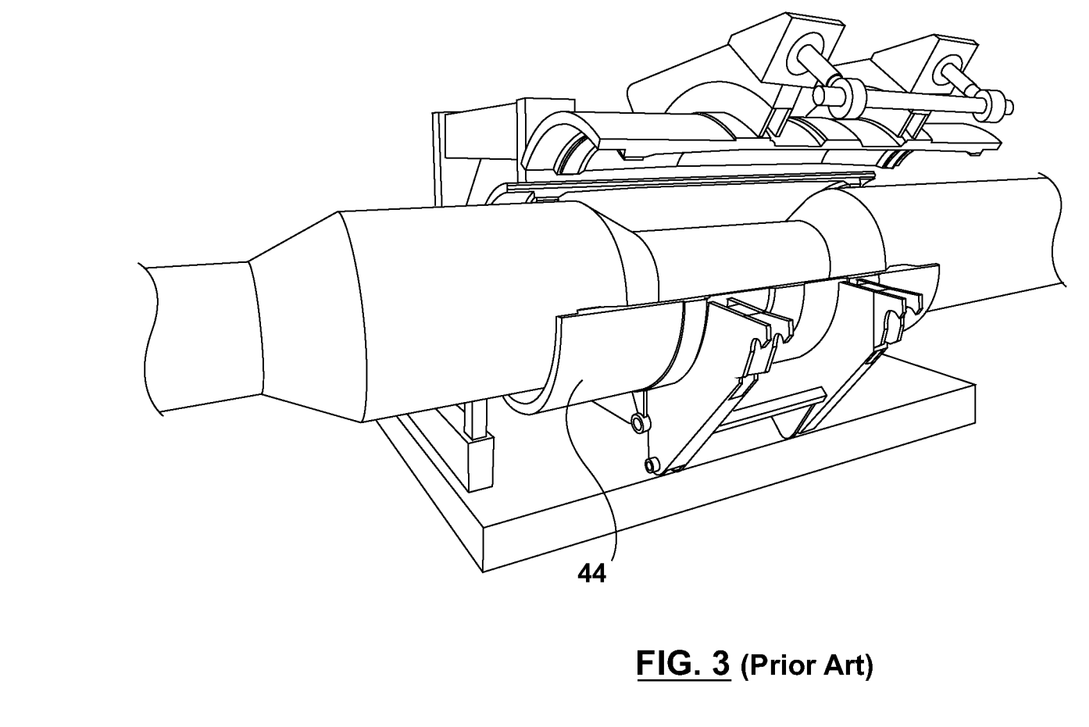
FIG. 3 shows a photograph of a mold for IMPP being placed around a pipe at a pipe joint.

The temperature of the FBE/adhesive layer 38, 40, 42, the chamfer region 32, and the overlap region 34 were measured and maintained. A mold 44 with a barrel shape design was lined up with the field joint, centered over the joint using markings pre-marked on the line coating, and closed around the pipe (FIG. 3).

Figure 4:
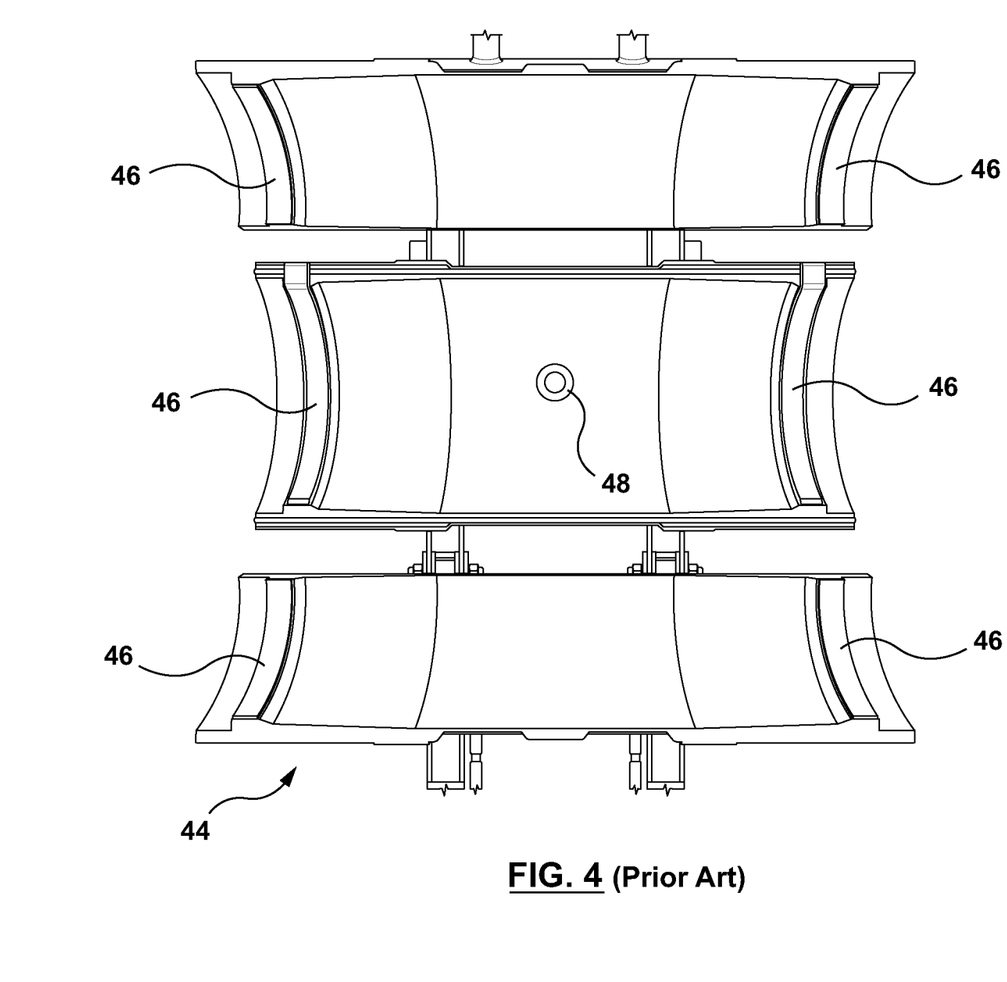
FIG. 4 shows the mold of FIG. 3 in isolation.

The mold 44 is shown in isolation in FIG. 4. In particular, optional end rubber seals 46 are shown, installed on both mold ends to prevent IMPP overflow over the line coating. Also shown is injection port 48. Once the mold 44 was closed around the pipe, molten polypropylene was injected into the mold 44 through injection port 48 until the mold 44 was completely filled, as determined by monitoring the back pressure applied on the mold lock (not shown). Injection pressure was then gradually dropped to a back pressure, to avoid molten polypropylene pushing back up the injection inlets (not shown) through the injection port 48. The mold 44 was kept in place around the pipe as the polypropylene was allowed to cool. Optionally, quenching water was circulated through conduits (not shown) within the mold 44, to accelerate cooling time.

The mold 44 was then removed and retracted from the field joint, leaving the polypropylene behind. Excess injection molded polypropylene material was trimmed using a double handed knife or a grinder/scraper, to remove edges, polypropylene lumps, dents or mold lines.

A quenching unit capable of keeping water temperature within a specified range was used to cool the IMPP field joint. The coating was then inspected.

Figure 5:
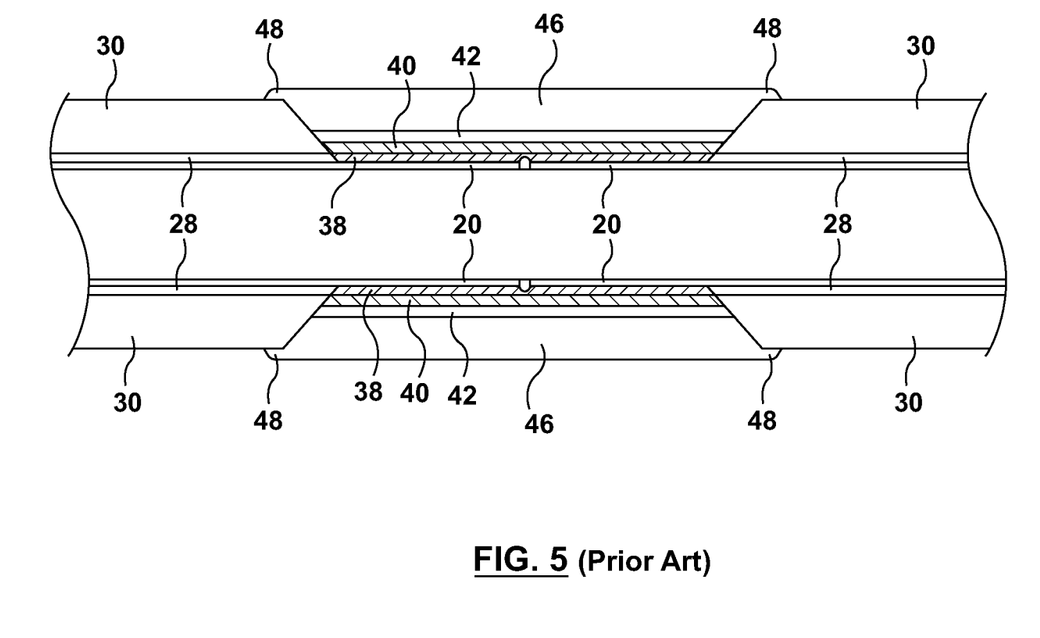
FIG. 5 shows a cross-sectional, generally schematic view of a pipe with a polypropylene field joint installed.
Figure 6A:
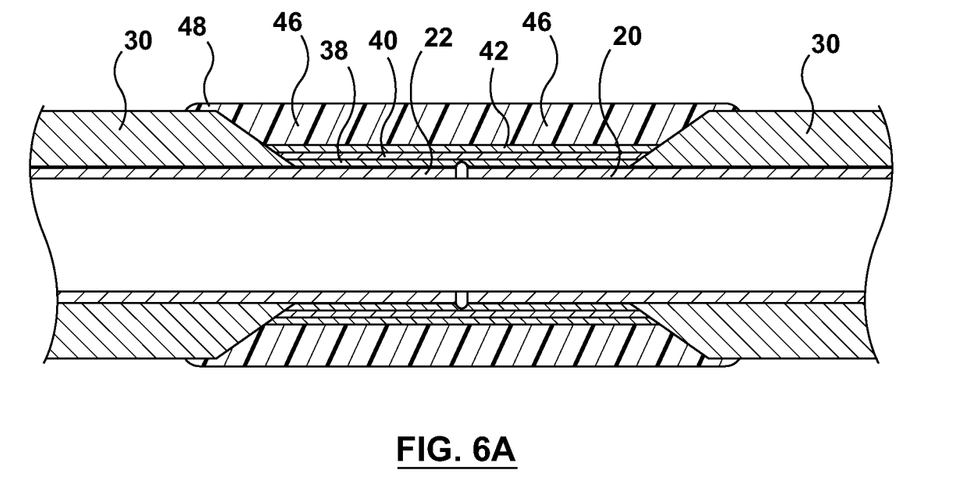
FIGS. 6A and B are further cross-sectional views showing cross sections of the field joint of FIG. 5.
Figure 6B:
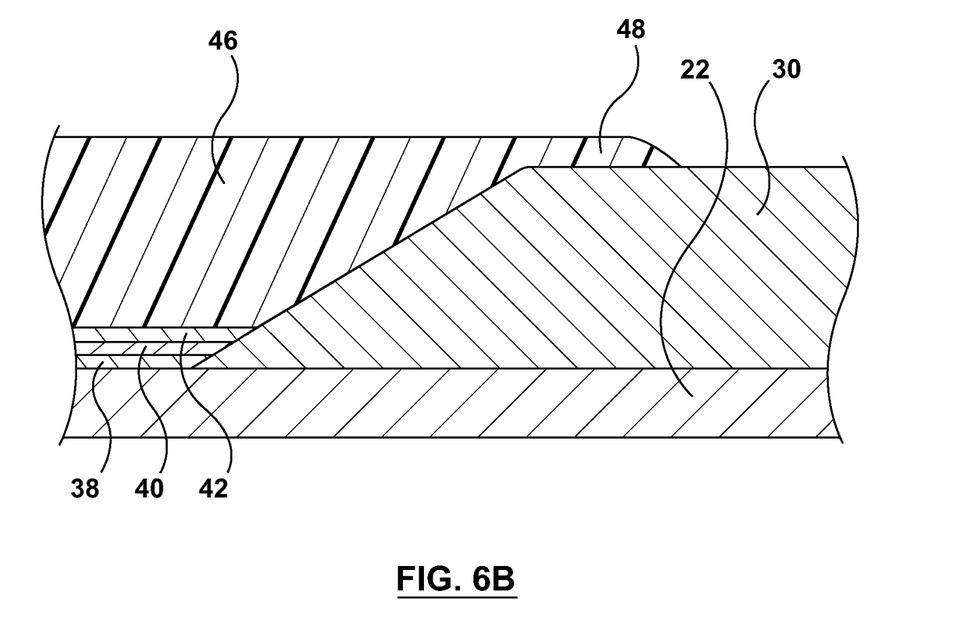

A schematic cross-section of the pipe with the polypropylene field joint is shown in FIG. 5, with field joint polypropylene coating 46 shown. Polypropylene coating 46 can be seen to overlap with the line coating at upstand 48 corresponding to overlap region 34 in the other figures. A further drawing showing a cross section of the field joint is shown in FIG. 6A, with a close up of the upstand 48 shown at FIG. 6b.

Example 2: Field Joint with Alternative Geometry

In one example of the present invention, a field joint was IMPP coated using the methodology outlined in Example 1, but utilizing a different mold—one which provided geometry to the exterior coating, for example, a geometry that provided circumferential grooves in the coating.

Figure 7A:
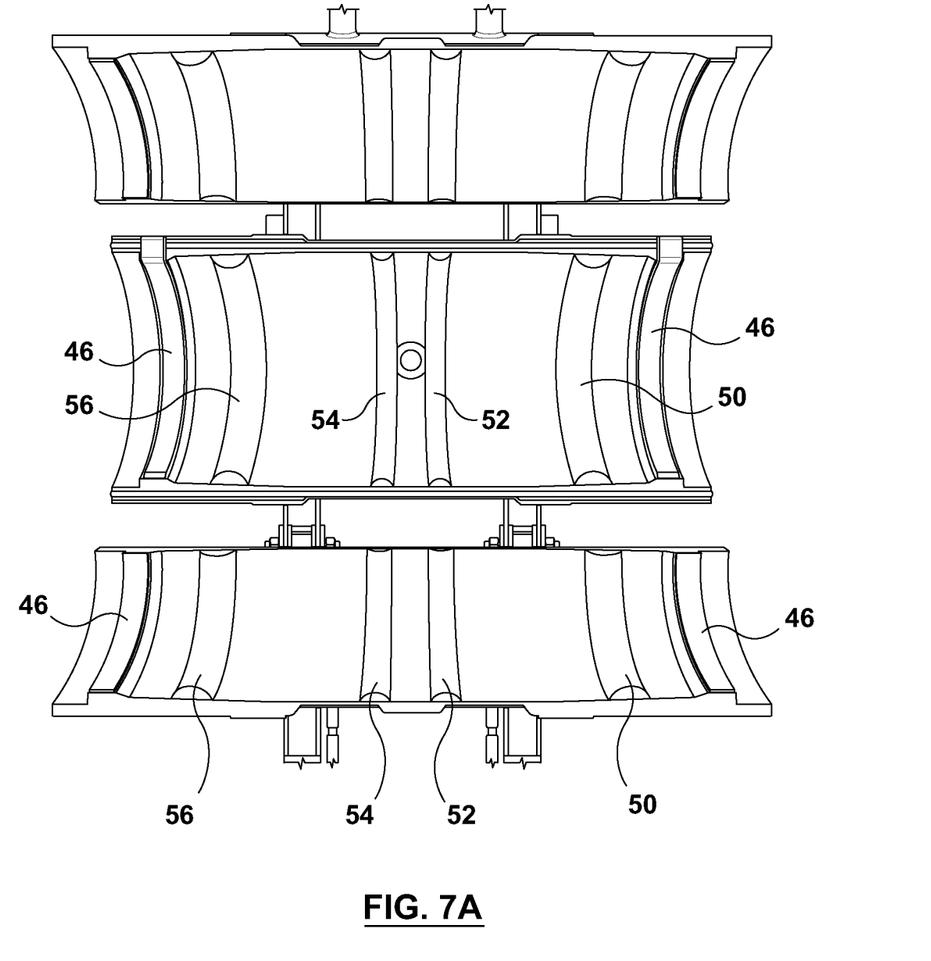
FIGS. 7A and B are views of a mold for IMPP of the present invention.
Figure 7B:
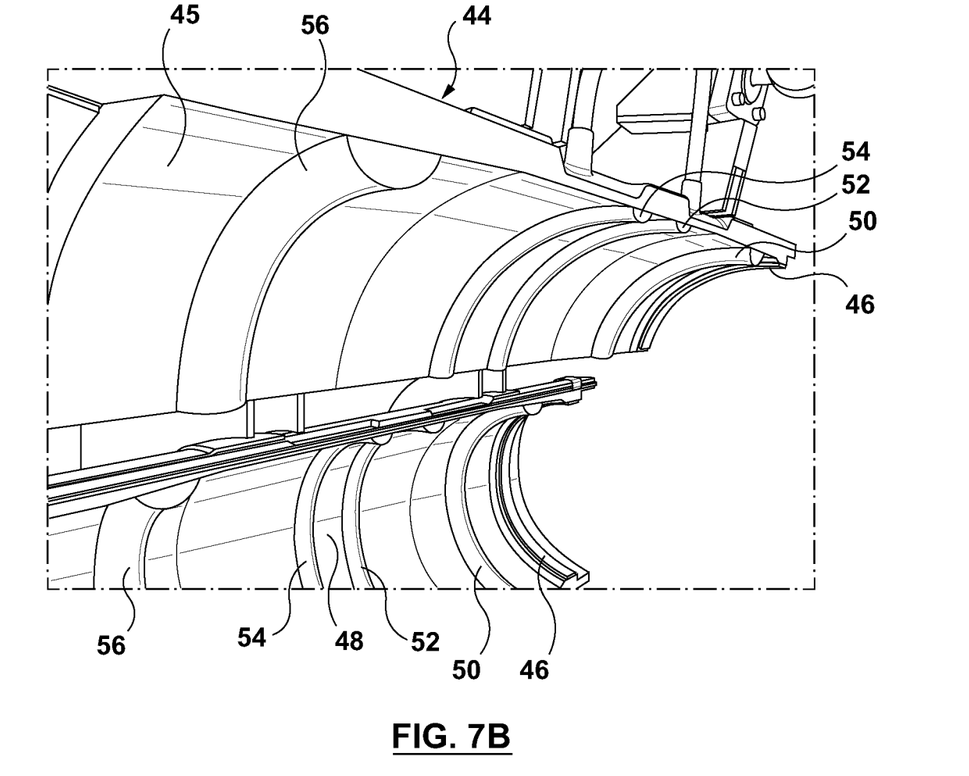
Figure 8:
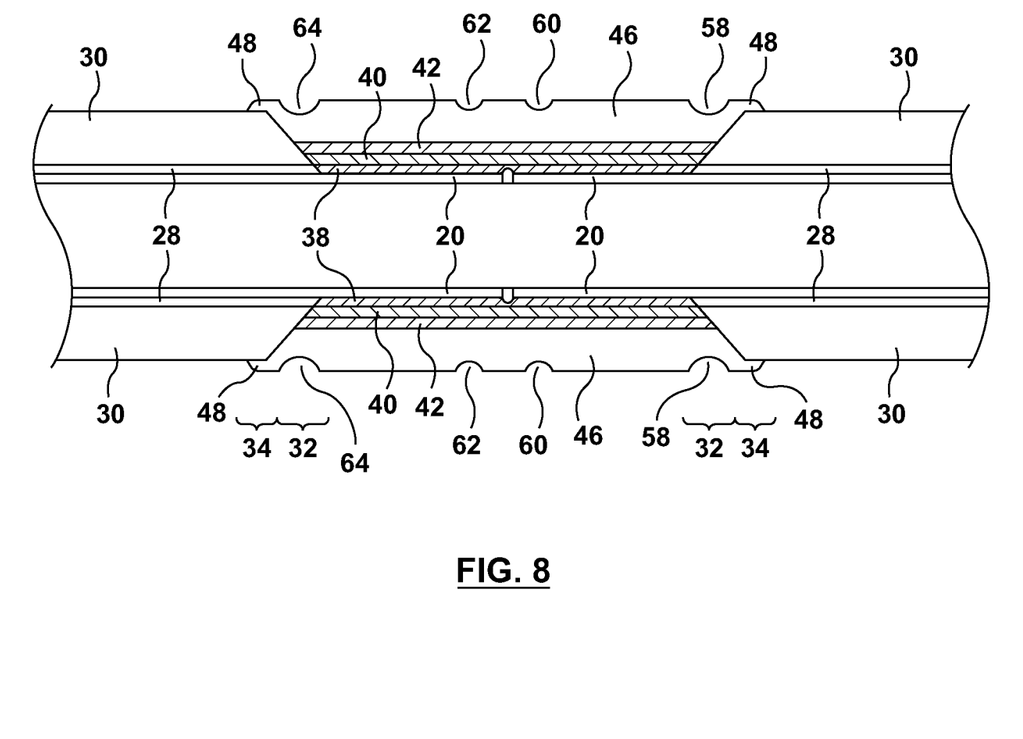
FIG. 8 is a cross sectional schematic view of a coating manufactured with the mold of FIG. 7A.
Figure 9:
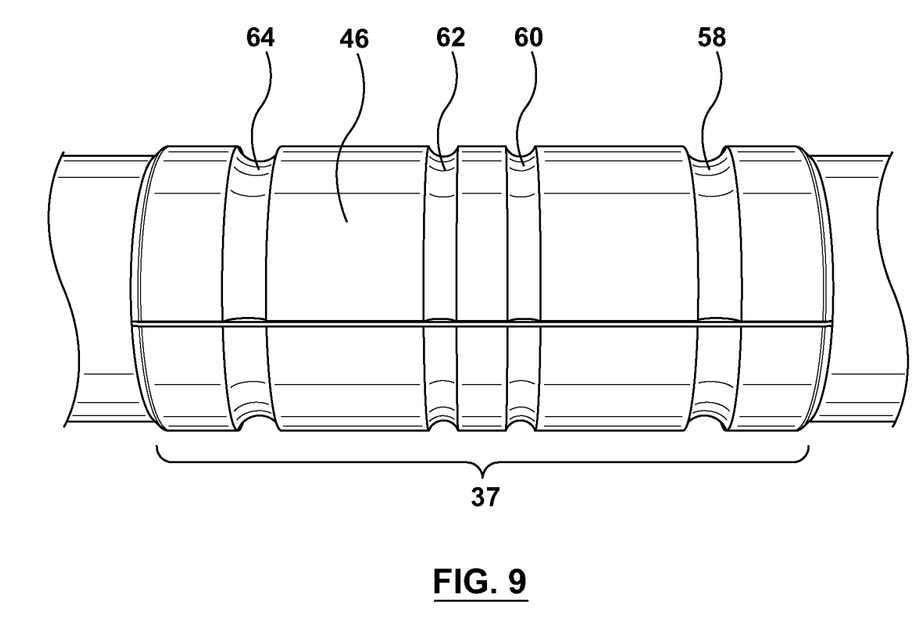
FIG. 9 shows a view of the exterior of the pipe with the polypropylene field joint of FIG. 8.
Figure 10:
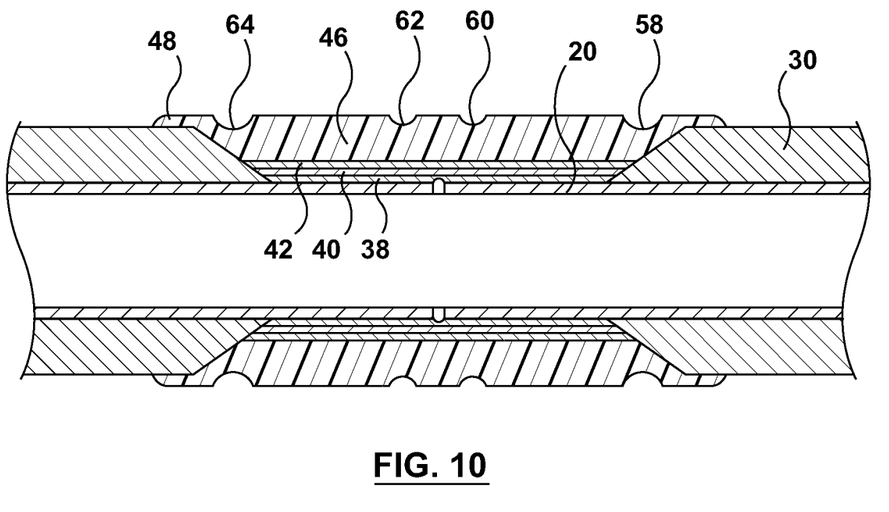
FIG. 10 shows a further cross sectional schematic view of a coating manufactured with the mold of FIG. 7A.

A mold 44 having an exemplification of such a geometry can be seen in FIGS. 7A-B. The mold comprises hemispherical inserts 50, 52, 54, 56 welded along the inner circumference 45 of the mold, to impart circumferential grooves in the coating. The use of this modified mold provides a coating 46 radially extending from the pipe within the field joint coating region 37, said coating 46 having the cross-sectional shape shown in FIG. 8. FIG. 8 shows coating 46, on pipe 20, with grooves 58, 64 (created by hemispherical inserts 50, 56, respectively) within the chamfer region 32, and further grooves 60, 62 proximal to the girth weld region (and created by hemispherical inserts 52, 54, respectively). FIG. 9 shows the outside view of the coating 46 radially extending from pipe 20, 22 at field coating region 37. FIG. 10 is a further view of a cross section of the field joint, where the field joint has been cut longitudinally along the pipe length.

When determining desirable geometry, it was found that it was desirable to design the field joint mould (and, therefore, the field joint) to provide geometry limiting the volume of IMPP material to as low as possible, thus reducing the level of residual stress imparted to the linepipe coating through volumetric shrinkage, whilst maintaining the overall integrity of the field joint and project heat transfer properties.

As shown in FIGS. 8 and 9, it was found that grooves 64 and 58 should ideally maintain a smaller radius than the vertical distance for the centroid to the intersection point of the linepipe coating, minus the minimum flow area during injection. It was found that the same horizontal distance should ideally be maintained from the overlap region (48).

In preferred embodiments, grooves 62 and 60 had a radius of less than 50% of field joint thickness, to provide adequate structural stability during reeling.

It was also found that, in preferred embodiments, the grooves should be deeper than the overlap depth (48), shown in FIG. 9 as 10 mm, to limit residual stress level.

With some routine experimentation, a non-linear relationship can be established for each pipe and coating geometry to identify the optimum number and radius of grooves, whilst maintaining stability and thermal performance. In certain embodiments, for example, it was found that elliptical, rather than hemispherical, grooves may be preferable, providing higher reduction in residual stress, since shrinkage (and resulting stresses at the overlap region) acted predominately in the horizontal plane. As would be understood by a person of skill in the art, mold geometry also should be assessed and optimized for stability in cooling and industrialization.

Figure 11:
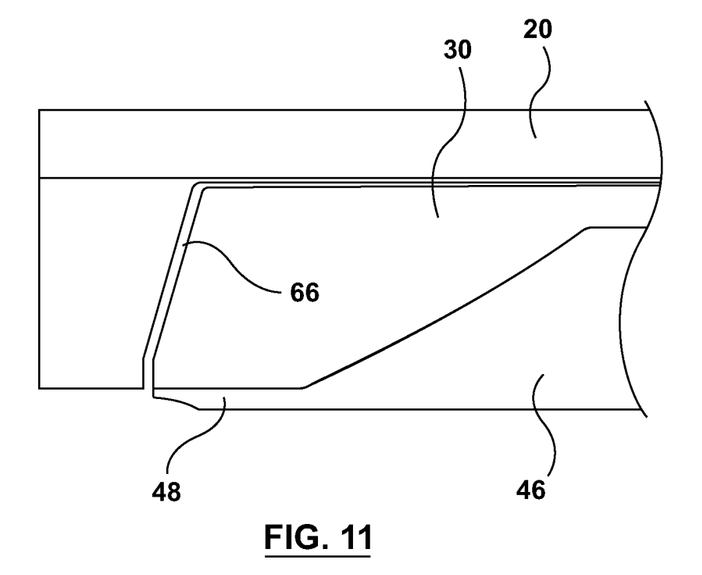
FIG. 11 shows an illustration of a cross-section of a prior art field joint.
Figure 12:
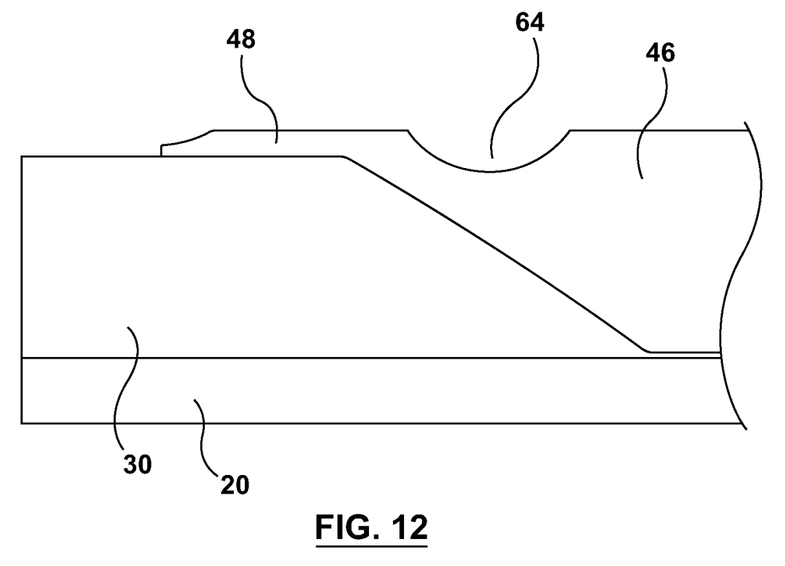
FIG. 12 shows an illustration of a cross-section of the field joint of the present invention.

It was found that the use of circumferential grooves around the IMPP field joint coating (hemispherical and/or elliptical) appeared to provide a noticeable decrease in cracking which occurred, both while the field joint coating was cooling, and post-cooling, when the pipes were bent during reeling/spooling. FIG. 11 shows a typical crack 66 in the line coating 30, post-reeling. Such a crack 66 was shown to be prevented in the pipes having circumferential grooves 58 around the IMPP field joint 46, as shown in FIG. 12. Note that pipes shown in FIGS. 11 and 12 were manufactured in the same method, using the same materials, and subjected to the same reeling strain, with the only difference being the use of an IMPP mold which provided grooves 58, 60, 62, 64.

Note that for the sake of clarity of illustration, non-IMPP layers (shown as 38, 40 and 42 in other figures) are not shown in the schematic of FIGS. 11 and 12, though they would be present.

Example 3: Field Joint with Standard Geometry

Although the crack prevention of Example 2 is extremely desirable, in many cases it is also desirable to have a smooth field joint. For example, the grooves present in the field joint coating of Example 2 may increase the probability of snagging when the pipes are reeled or unreeled. Therefore, it is desirable to have a field joint coating with the advantages of Example 2, but without the circumferential grooves.

Without being limited by theory, it is believed that the circumferential grooves prevent cracking by reducing the stresses placed on the line coating as a result of shrinkage of other displacement of the IMPP coating as it is cooling and/or curing. Accordingly, the final shape of the field joint is less important to crack prevention than the existence of the grooves during the cooling/curing process.

A field joint was IMPP coated using the methodology outlined in Example 2. After the IMPP coating had cooled and set, the grooves were filled with polypropylene, either using a second casting/injection molding process, or simply by adding polypropylene from an extruder. This filler coating was allowed to cool and set. This method provided a field joint geometry near identical to that of FIG. 1, by allowing the IMPP field joint having grooves to set and harden, then applying more polypropylene to the grooves. The field joint of this method provided the reeling resistance of the coating of Example 2, with the desirable near flush finish of Example 1.

Example 4: Further Alternative Geometries

Figure 7C:
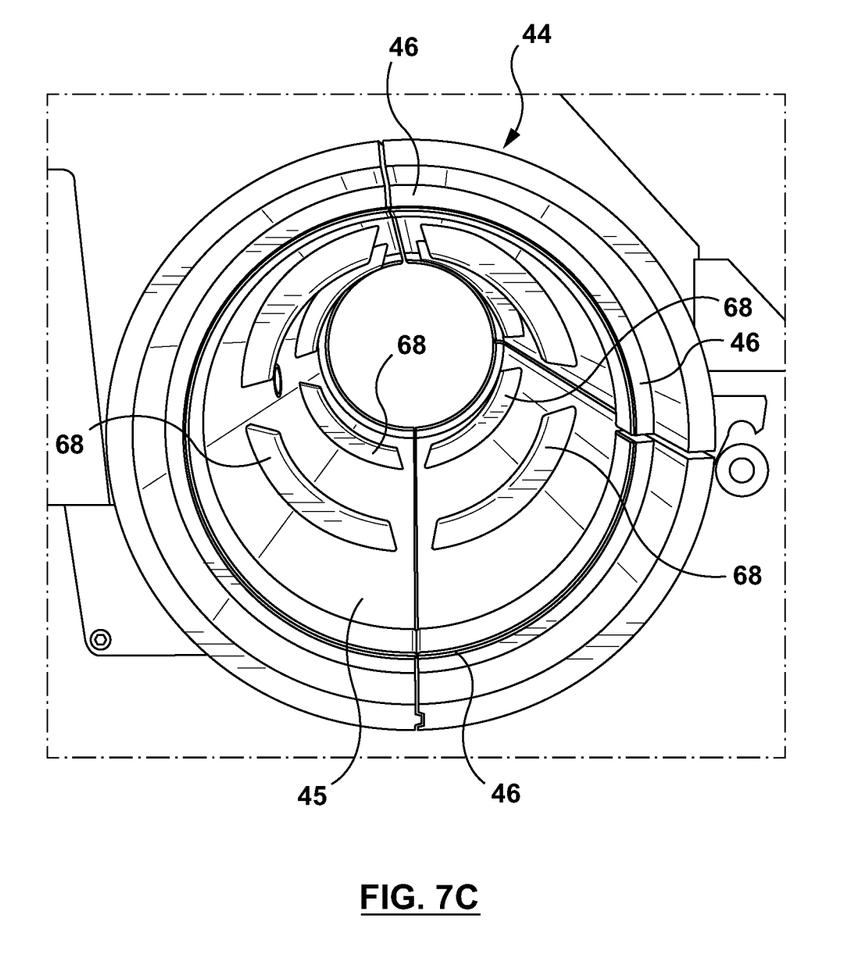
FIG. 7C is a photograph of a mold of an alternative embodiment of the present invention.

It is believed that further alternative geometries, may also provide line coating crack resistance, by releasing strain on the line coating proximal to the IMPP coating. A mold capable of providing further alternative geometries can be seen in FIG. 7C, which, for example, instead of having convex cylindrical profile inserts, inserts running the entire circumference of the mold, has perpendicular inserts 68 interspersed within the mold, and not running the entire circumference.

The invention claimed is:

1. An injection molded polypropylene (IMPP) coating for a field joint of an oil or gas pipeline, said IMPP coating having at least two circumferential grooves after the IMPP coating has hardened.

2. The injection molded polypropylene coating of claim 1 wherein at least one of the circumferential grooves is within a chamfer region of the pipe joint.

3. The injection molded polypropylene coating of any claim 1 wherein at least one of the circumferential grooves runs along the entire circumference of the IMPP coating.

4. The injection molded polypropylene coating of claim 1 wherein at least one of the circumferential grooves runs along at least half the circumference of the IMPP coating.

5. The injection molded polypropylene coating of claim 1 wherein at least one of the circumferential grooves has a hemispherical profile.

6. The injection molded polypropylene coating of claim 1 wherein at least one of the circumferential grooves has an elliptical profile.

7. The injection molded polypropylene coating of claim 1 wherein at least one of the circumferential grooves has a radius of less than 50% of a maximum thickness of the injection molded polypropylene coating.

8. The injection molded polypropylene coating of claim 1 wherein at least one of the circumferential grooves has a radius that is smaller than a vertical distance from a centroid to an intersection point of a linepipe coating on said pipeline.

9. The injection molded polypropylene coating of claim 1 wherein at least one of the circumferential grooves has a depth of greater than 10 mm.

10. The injection molded polypropylene coating of claim 1 having at least four circumferential grooves.

* * * * *